(12) United States Patent
Qiu

(10) Patent No.: US 12,641,342 B2
(45) Date of Patent: May 26, 2026

(54) MULTI-EXPOSURE CONTROL METHOD AND DEVICE FOR IMAGE SENSOR, STORAGE MEDIUM, TERMINAL

(71) Applicant: Black Sesame Technologies Co., Ltd., Wuhan (CN)

(72) Inventor: Zhiqiang Qiu, Shanghai (CN)

(73) Assignee: BLACK SESAME TECHNOLOGIES CO., LTD., Wuhan (CN)

( * ) Notice: Subject to any disclaimer, the term of this patent is extended or adjusted under 35 U.S.C. 154(b) by 39 days.

(21) Appl. No.: 19/018,431

(22) Filed: Jan. 13, 2025

(65) Prior Publication Data

US 2025/0234094 A1      Jul. 17, 2025

(30) Foreign Application Priority Data

Jan. 16, 2024    (CN) .......................... 202410065723.3

(51) Int. Cl.
H04N 23/73        (2023.01)
H04N 23/741        (2023.01)

(52) U.S. Cl.
CPC ........... H04N 23/73 (2023.01); H04N 23/741 (2023.01)

(58) Field of Classification Search
CPC ...... H04N 23/73; H04N 23/741; H04N 23/70; H04N 23/72; H04N 23/88; H04N 23/951; H04N 25/51; H04N 25/57
See application file for complete search history.

(56) References Cited

U.S. PATENT DOCUMENTS

| | | | | |
|---|---|---|---|---|
| 11,889,033 B2 * | 1/2024 | Zhao | .................... | H04N 23/741 |
| 2017/0231215 A1 * | 8/2017 | Barton | ................. | A01K 11/006 |
| | | | | 43/60 |
| 2019/0339288 A1 * | 11/2019 | Gangadharan | ..... | G01N 33/6893 |
| 2020/0177788 A1 * | 6/2020 | Jiang | .................... | H04N 25/585 |
| 2021/0243352 A1 * | 8/2021 | Mcelvain | ............ | H04N 25/134 |

FOREIGN PATENT DOCUMENTS

| | | |
|---|---|---|
| CN | 106031149 A | 10/2016 |
| CN | 113206927 A | 8/2021 |

* cited by examiner

*Primary Examiner* — Hung H Lam

(74) *Attorney, Agent, or Firm* — Shun Yao; Yao Legal Services, Inc.

(57)        ABSTRACT

A multi-exposure control method includes: acquiring an HDR composite image of the current round composited by the image sensor, the HDR composite image acquired by performing HDR compositing on multiple captured images with different exposures output by the image sensor in the current round, and the multiple captured images with different exposures acquired by performing multi-exposure control on the image sensor using multiple exposure values of the current round; performing linear splitting processing on the HDR composite image of the current round based on the multiple exposure values of the current round to acquire multiple linear splitting images; determining a corresponding exposure value based on exposure statistics of each linear splitting images to acquire multiple exposure values of the next round; and performing multi-exposure control on the image sensor by using the multiple exposure values of the next round to acquire an HDR composite image of the next round.

14 Claims, 5 Drawing Sheets

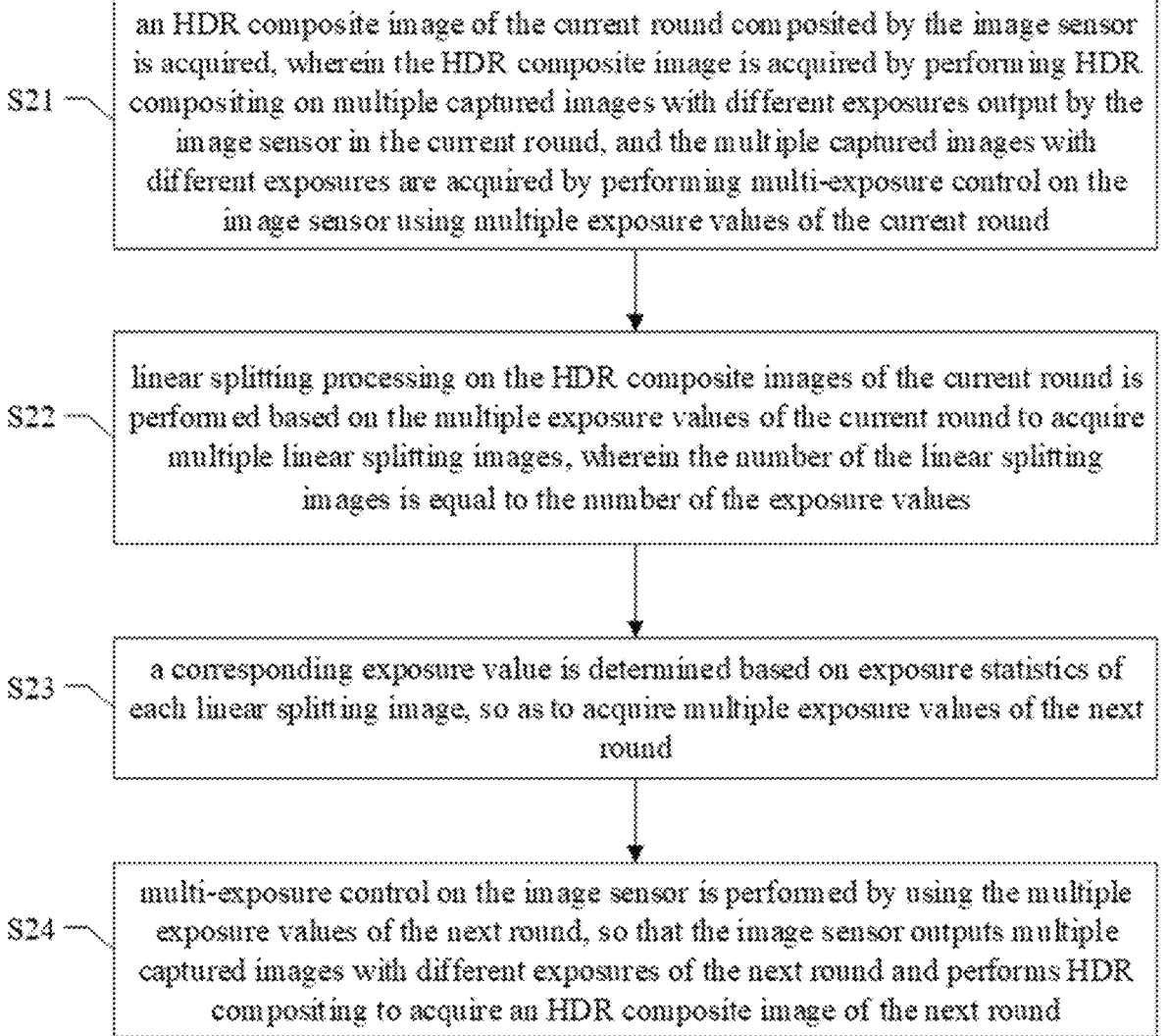

S21 — an HDR composite image of the current round composited by the image sensor is acquired, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round S22 — linear splitting processing on the HDR composite images of the current round is performed based on the multiple exposure values of the current round to acquire multiple linear splitting images, wherein the number of the linear splitting images is equal to the number of the exposure values S23 — a corresponding exposure value is determined based on exposure statistics of each linear splitting image, so as to acquire multiple exposure values of the next round S24 — multi-exposure control on the image sensor is performed by using the multiple exposure values of the next round, so that the image sensor outputs multiple captured images with different exposures of the next round and performs HDR compositing to acquire an HDR composite image of the next round

FIG. 2

S31 — an exposure ratio of each exposure value is determined based on the multiple exposure values of the current round S32 — regarding each exposure ratio, linear splitting processing on the HDR composite image of the current round is performed by using the exposure ratio to acquire the corresponding linear splitting image

MULTI-EXPOSURE CONTROL METHOD AND DEVICE FOR IMAGE SENSOR, STORAGE MEDIUM, TERMINAL

RELATED APPLICATION

This application claims the benefit under 35 U.S.C. § 119 (a) of the filing date of Chinese Patent Application No. 202410065723.3, filed in the Chinese Patent Office on Jan. 16, 2024. The disclosure of the foregoing application is herein incorporated by reference in its entirety.

FIELD

Embodiments of the present disclosure relate to the field of imaging technology, and more particularly, to a multi-exposure control method and device for an image sensor, a storage medium, and a terminal.

BACKGROUND

With the development of image sensor technology and autonomous driving technology, there are more and more image sensors applied in the field of automotive electronics on the market. Due to the requirements of special application scenarios such as autonomous driving, in order to reduce the transmission bandwidth between the image sensors and an Image Signal Processor (ISP), these image sensors generally support a High Dynamic Range (HDR) processing capability. Specifically, inside the image sensor, HDR compositing is performed on multiple captured images with different exposures to acquire a HDR composite image, and then the HDR composite image is input to the ISP.

The existing mainstream exposure control methods for an image sensor mainly acquire 3A statistics (including Auto Exposure (AE) statistics, Auto White Balance (AWB) statistics, and Auto Focus (AF) statistics) by performing 3A statistics on the current captured image output by the image sensor. Then, based on the 3A statistics, the exposure value is calculated (which can be determined by the parameter values of multiple exposure parameters), and then the image sensor is controlled to output a next captured image by using the calculated exposure value. This technology works as expected in single exposure control. However, when applied to the image sensor with HDR compositing, it is difficult to provide expected effect on multi-exposure control inside the image sensor, resulting in poor imaging quality.

SUMMARY

Embodiments of the present disclosure provide may solve the technical problem as: in the scene where the image sensor outputs HDR composite image, how to accurately perform multi-exposure control on the image sensor, thereby improving imaging quality.

In an embodiment of the present disclosure, a multi-exposure control method for an image sensor is provided, including: acquiring an HDR composite image of the current round composited by the image sensor, wherein the HDR composite image is acquired by performing HDR compos-iting on multiple captured images with different exposures output by the image sensor in the current round, and the multiple captured images with different exposures are acquired by performing multi-exposure control on the image sensor using multiple exposure values of the current round; performing linear splitting processing on the HDR compos-ite image of the current round based on the multiple exposure values of the current round to acquire multiple linear splitting images, wherein the number of the linear splitting images is equal to the number of the exposure values; determining a corresponding exposure value based on expo-sure statistics of each linear splitting image, so as to acquire multiple exposure values of a next round; and performing multi-exposure control on the image sensor by using the multiple exposure values of the next round, so that the image sensor outputs multiple captured images with different expo-sures of the next round and performs HDR compositing to acquire an HDR composite image of the next round.

Optionally, said performing linear splitting processing on the HDR composite image of the current round based on the multiple exposure values of the current round to acquire multiple linear splitting images includes: determining an exposure ratio of each exposure value based on the multiple exposure values of the current round; and regarding each exposure ratio, performing linear splitting processing on the HDR composite image of the current round by using the exposure ratio to acquire the corresponding linear splitting image.

Optionally, said regarding each exposure ratio, perform-ing linear splitting processing on the HDR composite image of the current round by using the exposure ratio to acquire the corresponding linear splitting image includes: regarding at least a part of the pixels of the HDR composite image of the current round, calculating the product value of the pixel value of each pixel and the exposure ratio, and determining a linearly processed pixel value of the pixel based on the product value, so as to acquire the corresponding linear splitting image.

Optionally, said determining a linearly processed pixel value of the pixel based on the product value includes: judging whether the product value is greater than or equal to a predetermined pixel value threshold; responsive to a judgment result of yes, the pixel value threshold is adopted as the linearly processed pixel value of the pixel; and responsive to the judgment result of no, the product value is adopted as the linearly processed pixel value of the pixel.

Optionally, the exposure ratio of each exposure value is determined by the following formula:

$$x_i = \frac{a_i}{a_{max}};$$

wherein $a_i$ represents an i-th exposure value of the current round, $a_{max}$ represents a maximum exposure value among the multiple exposure values of the current round, and $x_i$ represents the exposure ratio of the i-th exposure value among the multiple exposure values of the current round.

Optionally, after acquiring the multiple exposure values of the next round, the method further includes: performing HDR compositing on the multiple linear splitting images by using the multiple exposure values of the next round, so as to acquire the final image of the next round.

In an embodiment of the present disclosure, a multi-exposure control device for an image sensor is provided, including: an HDR composite image acquiring circuitry configured to acquire an HDR composite image of the current round composited by the image sensor, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round; a linear splitting circuitry configured to perform linear splitting processing on the HDR composite image of the current round based on the multiple exposure values of the current round to acquire multiple linear splitting images, wherein the number of the linear splitting images is equal to the number of the exposure values; and a multi-exposure values determining circuitry configured to determine a corresponding exposure value based on exposure statistics of each linear splitting image, so as to acquire multiple exposure values of the next round; and a multi-exposure control circuitry configured to perform multi exposure control on the image sensor by using the multiple exposure values of a next round, so that the image sensor outputs multiple captured images with different exposures of the next round and performs HDR compositing to acquire an HDR composite image of the next round.

Optionally, the multi-exposure control device further includes: an HDR compositing circuitry configured to perform HDR compositing on the multiple linear splitting images by using the multiple exposure values of the next round, so as to acquire the final image of the next round, following acquiring the multiple exposure values of the next round.

In an embodiment of the present disclosure, a storage medium comprising computer-executable instructions stored thereon is provided, wherein when the computer-executable instructions executed by a processor, the above multi-exposure control method for an image sensor is performed.

In an embodiment of the present disclosure, a terminal is provided, including: a processor; and a memory for storing processor-executable instructions; wherein the processor is configured to perform the above multi-exposure control method for an image sensor when executing the processor-executable instructions.

Compared with the existing techniques, Embodiments of the present disclosure may provide following advantages.

In some embodiments of the present disclosure, after acquiring the HDR composite image of the current round composited by the image sensor, multiple exposure values of the current round are used to perform linear splitting processing on the HDR composite image of the current round, so as to acquire multiple linear splitting images, wherein the number of the linear splitting images is equal to the number of the exposure values; and then a corresponding exposure value is determined based on exposure statistics of each linear splitting image, so as to acquire multiple exposure values of the next round; the multiple exposure values of the next round are used to perform multi-exposure control on the image sensor, so that the image sensor outputs multiple captured images with different exposures of the next round and performs HDR compositing to acquire an HDR composite image of the next round.

Due to the loss of linear correlation between the HDR composite image composited by the image sensor and the multiple captured images with different exposures used to composite the HDR composite image, embodiments of the present disclosure use multiple exposure values of the current round to perform linear splitting processing on the HDR composite image of the current round, which may achieve the following correlation: pixel values of the multiple linear splitting images have an approximate linear correlation with the pixel values of the multiple captured images with different exposures (referred to as pre composite images) used to composite the HDR composite image of the current round. Compared to directly using the exposure statistics of the HDR composite image to determine the exposure value of the next round, embodiments of the present disclosure use the exposure statistics of the multiple linear splitting images which have approximate linear correlation with the multiple captured images with different exposures, so that the exposure situation of each pre composite image output in the current round can be more accurately characterized. Therefore, exposure values determined based on the exposure statistics of the linear splitting images can provide more accurate multi-exposure control on the image sensor in one or more subsequent rounds, thereby improving the final imaging quality.

BRIEF DESCRIPTION OF THE DRAWINGS

FIG. 2 is a flow chart of a multi-exposure control method for image sensors according to an embodiment of the present disclosure;

DETAILED DESCRIPTION OF EMBODIMENTS

As mentioned in the background section, the existing mainstream exposure control methods for an image sensor mainly perform 3A statistics on the current captured image output by the image sensor and calculate the exposure value; then, the calculated exposure value is used to control the image sensor to output the next captured image.

Figure 1:
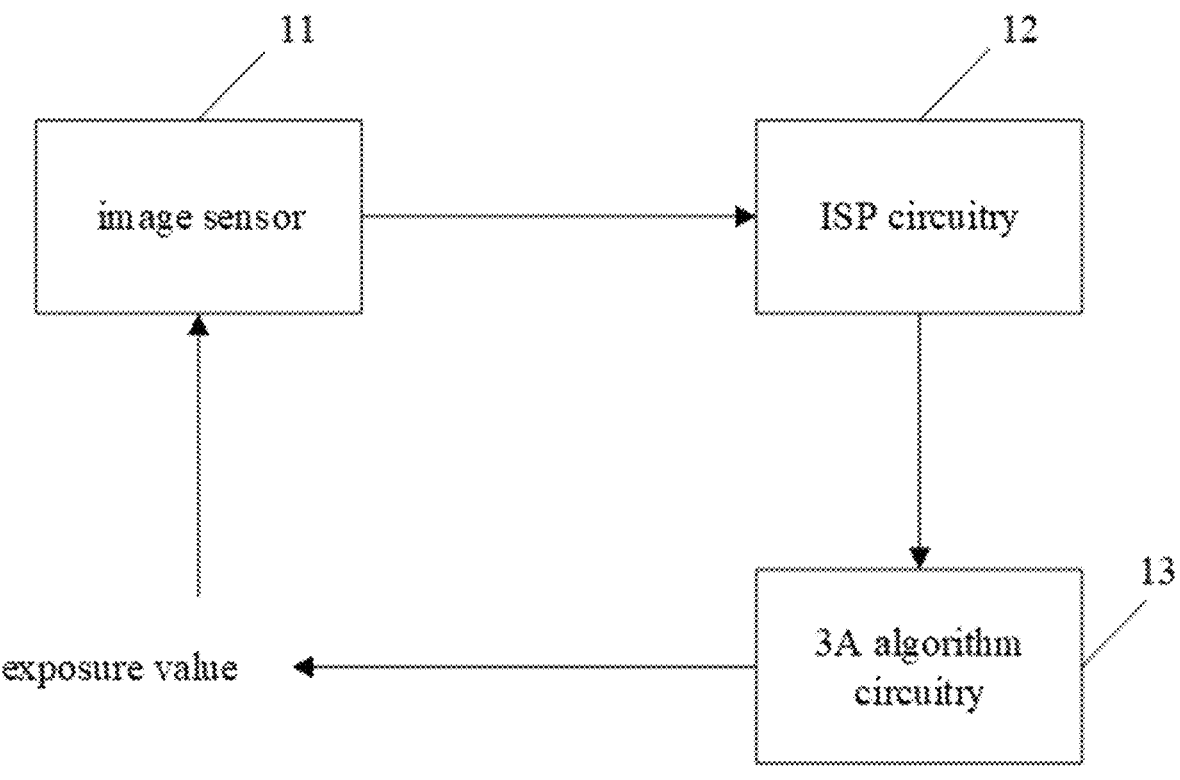
FIG. 1 is a schematic diagram of the architecture of an exposure control system for an image sensor in existing techniques.

Referring to FIG. 1, a schematic diagram of the architecture of an exposure control system for an image sensor in existing techniques is provided.

Wherein, an image sensor 11 outputs a current captured image to an ISP circuitry 12 for exposure statistics, to acquire the exposure statistics of the current captured image. Then, an exposure value is calculated by a 3A algorithm circuitry 13; The exposure value is then input to the image sensor 11 to perform exposure control on the image sensor 11 to acquire a next captured image, and cycle the above process.

However, when the above method is applied to an image sensor with HDR compositing, it is difficult to provide expected effect on multi-exposure control inside the image sensor.

The inventor of the present disclosure has found that the main reason for the above-mentioned problem is that, a HDR composite image is usually acquired by using a HDR compositing algorithm to fuse, for example, weighted summation, pixel values of original captured images with different exposures. Therefore, a linear correlation between pixels of the HDR composite image and pixels of each original captured image (which can be referred to as pre composite image) will be lost. Accordingly, the subsequent exposure statistics (usually referred to as the 3A statistics)

calculated based on the HDR composite image will also have a large deviation from the exposure statistics of the pre composite images. Therefore, responsive to the exposure statistics of the HDR composite image output by the image sensor are subsequently used to calculate the exposure value, and the exposure value calculated is used to perform exposure control on the image sensor, the exposure control of the image sensor will be biased, and the image quality output by the image sensor will be poor.

In order to solve the above-mentioned technical problems, embodiments of the present disclosure provide a multi-exposure control method for an image sensor, including: acquiring an HDR composite image of the current round composited by the image sensor, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round; performing linear splitting processing on the HDR composite image of the current round based on the multiple exposure values of the current round to acquire multiple linear splitting images, wherein the number of the linear splitting images is equal to the number of the exposure values; determining a corresponding exposure value based on exposure statistics of each linear splitting image, so as to acquire multiple exposure values of the next round; and performing multi-exposure control on the image sensor by using the multiple exposure values of the next round, so that the image sensor outputs multiple captured images with different exposures of the next round and performs HDR compositing to acquire an HDR composite image of the next round.

From the above, in some embodiments of the present disclosure, after acquiring the HDR composite image of the current round composited by the image sensor, multiple exposure values of the current round are used to perform linear splitting processing on the HDR composite image of the current round, which may achieve that the pixel values of the multiple linear splitting images have an approximate linear correlation with the pixel values of the multiple captured images with different exposures (referred to as pre composite images) used to composite the HDR composite image of the current round. Compared to directly using the exposure statistics of the HDR composite image to determine the exposure value of the next round, embodiments of the present disclosure use the exposure statistics of the multiple linear splitting images which have approximate linear correlation with the multiple captured images with different exposures, so that the exposure situation of each pre composite image output in the current round can be more accurately characterized. Therefore, exposure values determined based on the exposure statistics of the linear splitting images can provide more accurate multi-exposure control of the image sensor in one or more subsequent rounds, thereby improving the final imaging quality.

In order to clarify the objects, characteristics and advantages of the disclosure, embodiments of the present disclosure will be described in detail in conjunction with accompanying drawings.

Referring to FIG. 2, a flow chart of a multi-exposure control method for an image sensor according to an embodiment of the present disclosure is provided. The described method may include Steps S21 to S24.

In S21, an HDR composite image of the current round composited by the image sensor is acquired, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round.

In S22, linear splitting processing on the HDR composite image of the current round is performed based on the multiple exposure values of the current round to acquire multiple linear splitting images, wherein the number of the linear splitting images is equal to the number of the exposure values.

In S23, a corresponding exposure value is determined based on exposure statistics of each linear splitting image, so as to acquire multiple exposure values of a next round.

In S24, multi-exposure control on the image sensor is performed by using the multiple exposure values of the next round, so that the image sensor outputs multiple captured images with different exposures of the next round and performs HDR compositing to acquire an HDR composite image of the next round.

Further, the S21 to S24 may be executed iteratively, and when the execution reaches the next round, the next round is the current round. Correspondingly, the HDR composite image of the next round acquired in S24 is the HDR composite image of the current round described in S21.

In some embodiments of S21, the image sensor can be equipped with HDR compositing function. The HDR compositing algorithm used for HDR compositing on the multiple captured images with different exposures output in the current round can be an existing conventional HDR compositing algorithm. For example, by weighted summation of the pixel values of the multiple captured images with different exposures, the weighted summation result can be used as the pixel value of the corresponding pixel of the HDR composite image.

In some embodiments of S22, linear splitting processing on the HDR composite image of the current round is performed based on the multiple exposure values of the current round to acquire multiple linear splitting images, wherein the number of the linear splitting images is equal to the number of the exposure values.

Specifically, the linear splitting processing refers to adjusting the pixel value of each pixel of the HDR composite image output in the current round based on each of the exposure values to acquire one corresponding linear splitting image. Thus, when the number of the exposure values is n, then n linear splitting images will be acquired after the linear splitting processing on the HDR composite image of the current round. The pixels of each linear splitting image contain not only information of the corresponding pixels in the HDR composite image, but also information of the exposure value.

Figure 3:
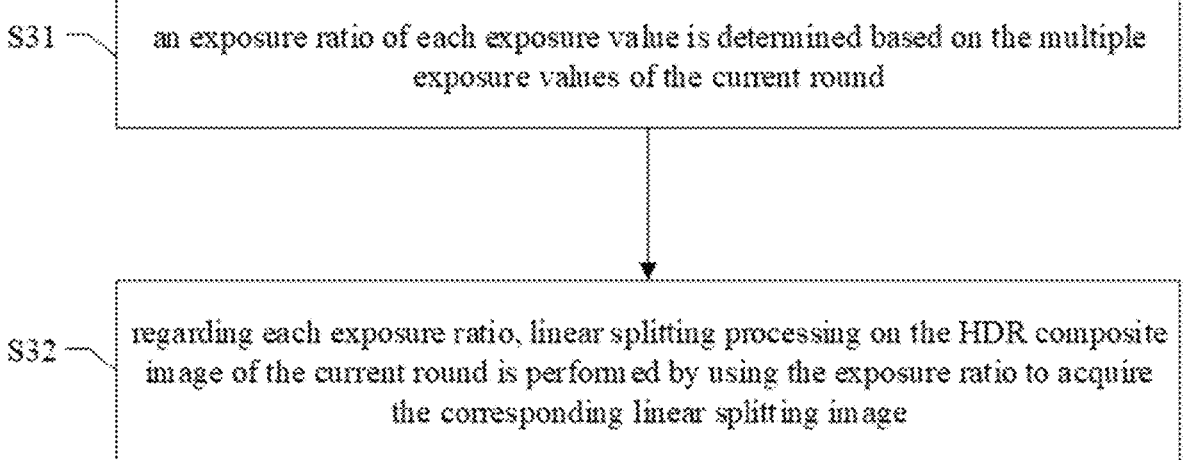
FIG. 3 is a flow chart of a specific embodiment of step S22 in FIG. 2.

Referring to FIG. 3, a flow chart of a specific embodiment of step S22 in FIG. 2 is provided. In this embodiment, S22 may include Steps S31 to S32.

In S31, an exposure ratio of each exposure value is determined based on the multiple exposure values of the current round.

In some embodiments, for each exposure value, the ratio of the exposure value to the maximum exposure value among the multiple exposure values can be used as the exposure ratio.

Specifically, the exposure ratio of each exposure value may be determined by the following formula:

$$x_1 = \frac{a_1}{a_{max}};$$

$$x_2 = \frac{a_2}{a_{max}};$$

$$\ldots$$

$$x_i = \frac{a_i}{a_{max}};$$

wherein $a_i$ represents an i-th exposure value of the current round, $a_{max}$ represents a maximum exposure value among the multiple exposure values of the current round, and $x_i$ represents the exposure ratio of the i-th exposure value among the multiple exposure values of the current round.

In practice, for a single exposure value, the exposure value can be the weighted operation result of multiple exposure-related parameters. For example, a single exposure value may be the result of a weighted product of parameter values of exposure-related parameters such as exposure time, sensitivity, and exposure gain. The specific method of determining the exposure value according to multiple exposure-related parameters may be referred to the existing techniques, and not described in detail in the embodiments of the present disclosure.

In S32, regarding each exposure ratio, linear splitting processing on the HDR composite image of the current round is performed by using the exposure ratio to acquire the corresponding linear splitting image.

Specifically, by using the exposure ratio of each exposure value, the pixel value of each pixel of the HDR composite image of the current round are adjusted to acquire one corresponding linear splitting image. Thus, when the number of exposure values is n, n exposure ratios will be acquired, and n linear splitting images will be acquired after the linear splitting processing is performed on the HDR composite image of the current round. The pixels of each linear splitting image contain not only the information of the corresponding pixels in the original HDR composite image, but also the information of the exposure ratio of the exposure value.

In some embodiments of the present disclosure, since the exposure ratio can represent the approximate ratio relationship among the pixel values of the multiple captured images with different exposures (referred to as the pre composite images) for acquiring the HDR image of the current round, linear splitting images with an approximate linear correlation with the pre composite images can be acquired by using the exposure ratio to perform linear splitting processing on the HDR composite image. Therefore, the subsequent exposure statistics acquired based on the linear splitting images can be more accurate, and more accurate multiple exposure values can be acquired for more accurate multi-exposure control on the image sensor.

Further, the S32 may include: regarding at least a part of the pixels of the HDR composite image of the current round, calculating the product value of the pixel value of each pixel and the exposure ratio, and determining a linearly processed pixel value of the pixel based on the product value, so as to acquire the corresponding linear splitting image.

Further, said determining a linearly processed pixel value of the pixel based on the product value includes: judging whether the product value is greater than or equal to a predetermined pixel value threshold; responsive to a judgment result of yes, the pixel value threshold is adopted as the linearly processed pixel value of the pixel; and responsive to the judgment result of no, the product value is adopted as the linearly processed pixel value of the pixel.

Wherein, the pixel value threshold can be appropriately set according to actual scenarios. For example, it can be set in combination with hardware computing power, storage space, expected accuracy of exposure control and other factors in the actual scenario.

In some embodiments of the present disclosure, by performing overflow processing based on the pixel value threshold, that is, when linearly processed pixel value is greater than or equal to the pixel value threshold, the pixel value threshold is adopted as the linearly processed pixel value. In this way, it can effectively avoid an error caused by the overflow of the pixel value of the linear splitting images, help to further improve the accuracy of the subsequent determined exposure value, thereby improving the effect of the multi-exposure on the image sensor.

In some embodiments, the above-mentioned linear splitting processing method based on the exposure ratio can be implemented for all pixels of the HDR composite image of the current round, so as to acquire the linearly processed pixel values of all pixels, to acquire the linear splitting image corresponding to the exposure ratio.

In some embodiments, the above-mentioned linear splitting processing method based on the exposure ratio can be implemented for part of the pixels (for example, the remaining pixels after removing noise pixels) selected from the HDR composite image of the current round, so as to acquire the linearly processed pixel values of those selected pixels. For the remaining pixels for which linear processing is not performed, the original pixel values or the pixel values after noise reduction can be adopted, and finally the linear splitting image corresponding to the exposure ratio can be acquired.

Continue to refer to FIG. 2, in some embodiments of S23, a corresponding exposure value is determined based on the exposure statistics of each linear splitting image, so as to acquire multiple exposure values of the next round.

Specifically, exposure statistics can be performed on each linear splitting image to acquire the exposure statistics. Wherein, the algorithm for exposure statistics can be, for example, 3A statistical algorithm, and the acquired exposure statistics can include Auto Exposure (AE) statistics, Auto White Balance (AWB) statistics, and Auto Focus (AF) statistics, which can be referred to as 3A statistics. Then the 3A algorithm can be used to analyze the 3A statistics and calculate the corresponding exposure parameters, and then determine the exposure value based on the parameter values of the exposure parameters.

In some embodiments of S24, the multiple exposure values corresponding to the multiple linear splitting images are used as the multiple exposure values of the next round. By using these exposure values to perform multi-exposure control on the image sensor, the image sensor can output multiple captured images with different exposures in the next round and perform HDR compositing to acquire the HDR composite image of the next round.

As for the detailed implementation of how to use the multiple exposure values of the next round to perform multi-exposure control on the image sensor, and how to perform HDR compositing may be referred to the existing techniques, and not described in detail here.

Figure 4:
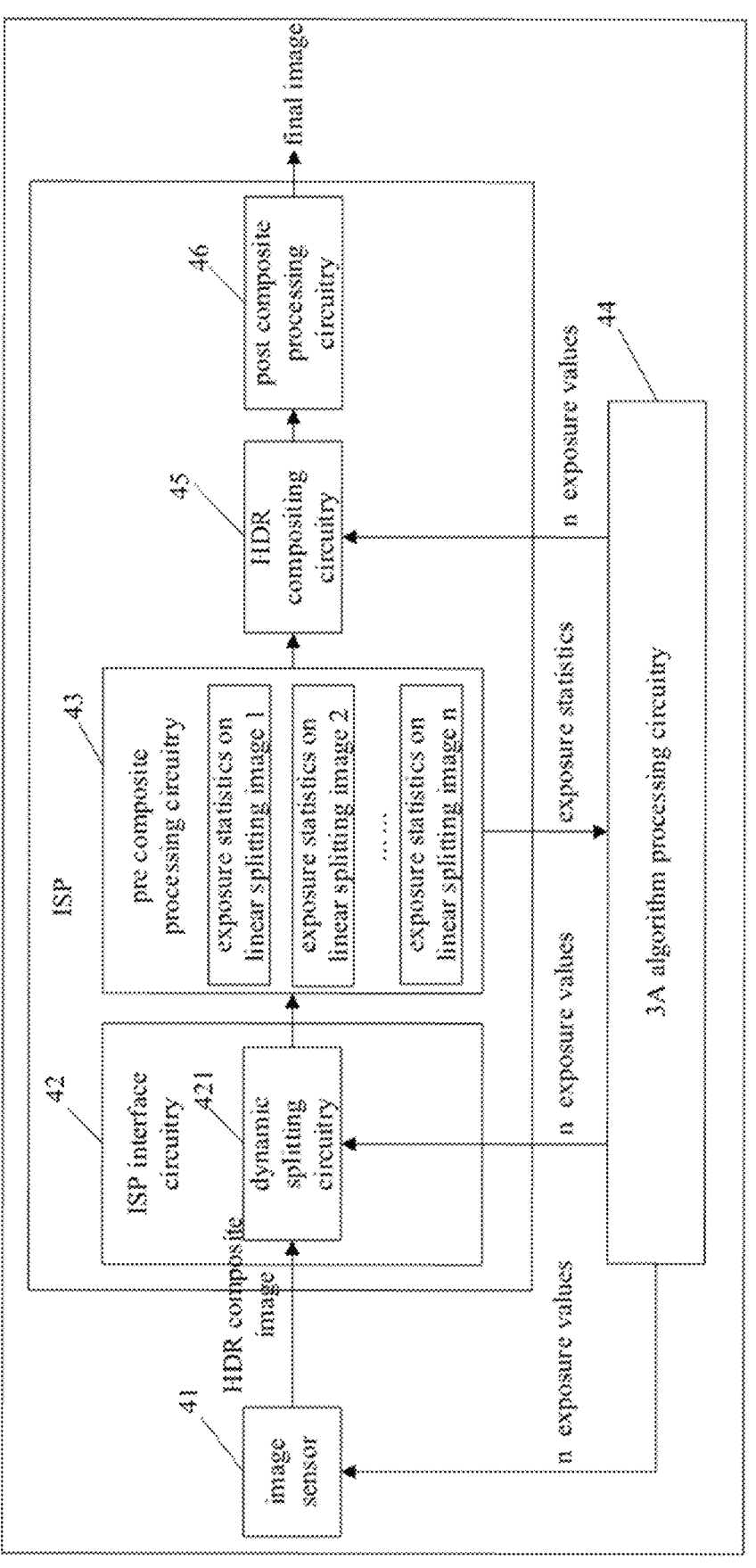
FIG. 4 is a schematic diagram of the architecture of a multi-exposure control system for an image sensor according to an embodiment of the present disclosure.

Referring to FIG. 4, a schematic diagram of the architecture of a multi-exposure control system for an image sensor according to an embodiment of the present disclosure is provided.

Wherein, the multi-exposure control system may include an image sensor 41, an ISP interface circuitry 42, a pre composite processing circuitry 43, and a 3A algorithm circuitry 44. The ISP interface circuitry 42 may include a dynamic splitting circuitry 421.

In one aspect, the multi-exposure control system may perform the basic process of multi-exposure control described below.

(1) The image sensor 41 outputs the HDR composite image of the current round to the dynamic splitting circuitry 421.

The HDR composite image of the current round can be acquired by performing HDR compositing on multiple captured images with different exposures output by image sensor 41 in the current round, and the multiple captured images with different exposures are acquired by performing multi-exposure control on the image sensor 41 using multiple exposure values of the current round. Wherein, the multiple exposure values of the current round are acquired by processing the HDR composite image composited by the image sensor 41 during the previous round of iteration.

It should be noted that in the first round, the multiple exposure values can be predetermined n initial exposure values, n>=2, and n is a positive integer. For example, in a start-up or initialization stage of the image sensor 41, the n initial exposure values are set for the image sensor 41 to control the image sensor 41 to output the multiple captured images with different exposures and perform HDR compositing to acquire the HDR composite image of the first round.

(2) The dynamic splitting circuitry 421 performs linear splitting processing on the HDR composite image of the current round output by the image sensor 41 based on the n exposure values of the current round to acquire n linear splitting images (i.e., linear splitting images 1~n), and then inputs them to the pre composite processing circuitry 43.

(3) The pre composite processing circuitry 43 performs exposure statistics on each linear splitting image to acquire corresponding exposure statistics, and inputs the exposure statistics to the 3A algorithm circuitry 44.

(4) The 3A algorithm circuitry 44 calculates the corresponding exposure value based on the exposure statistics of each linear splitting image, so as to acquire n exposure values of the next round.

(5) Multi-exposure control on the image sensor is performed by using the n exposure values of the next round, so that the image sensor outputs n captured images of different exposures of the next round and performs HDR compositing to acquire the HDR composite image of the next round.

The above steps (1)~(5) are performed iteratively until the predetermined termination iteration condition is satisfied, for example, the image sensor 41 is turned off or tentatively operated.

In some embodiments of the present disclosure, in each round of the iteration, by performing linear splitting processing on the HDR composite image of the current round composited by the image sensor, and performing exposure statistics and 3A calculation based on the multiple linear splitting image acquired by splitting to acquire multiple corresponding exposure values, which are used for the multi-exposure control on the image sensor in the round. Due to the approximate linear correlation between the pixel values of the multiple linear splitting images acquired in each round and the pixel values of the multiple captured images with different exposures (referred to as pre composite images) initially output by the image sensor, the exposure values determined based on the exposure statistics of the linear splitting images can enable more accurate multi-exposure control on the image sensor in one or more subsequent rounds. Furthermore, continuous optimization of multi-exposure control effects can be achieved through cyclic iteration.

Furthermore, in the other aspect, in addition to circuitries described above, the multi-exposure control system may also include an HDR compositing circuitry 45, which is configured to receive the n linear splitting images from the pre composite processing circuitry 43, and perform HDR compositing on the n linear splitting images. The method and principle of the HDR compositing circuitry 45 for performing HDR compositing can be same or similar to the method and principle of multi-exposure compositing performed by the image sensor 41.

Specifically, in each round of the iteration, after the 3A algorithm circuitry 44 determines the multiple (e.g. n) exposure values corresponding to the multiple linear splitting images, it can also input the multiple exposure values into the HDR compositing circuitry 45, so that the HDR compositing circuitry 45 can perform HDR compositing on the received multiple (e.g. n) linear splitting images in the next round to acquire a final image of the next round, and output it for user browsing.

It should be noted that in some embodiments of the present disclosure, in each round of iteration, after the 3A algorithm circuitry 44 calculates the n exposure values corresponding to the multiple linear splitting images, it will synchronously transmit (for example, using a system bus to transmit) the n exposure values to the image sensor 41, the dynamic splitting circuitry 421, and the HDR compositing circuitry 45, so as to ensure that the exposure values set for these circuitries are consistent. More specifically, the n exposure values newly calculated by the 3A algorithm circuitry 44 in the current round can be respectively used for the multi-exposure control on the image sensor 41 in the next round, for the dynamic splitting circuitry 421 to perform image splitting in the next round, and for the HDR compositing circuitry 45 to perform HDR compositing in the next round, and then output the final image of the next round for user browsing.

Furthermore, the multi-exposure control system may also include an post composite processing circuitry 46, specifically, in each round of iteration, after the HDR compositing circuitry 45 performs HDR compositing on the n linear splitting images, the HDR composite image can be input to the post composite processing circuitry 46 for post-processing, so as to acquire the final image (corresponding to the final image in FIG. 4).

Specifically, the HDR compositing circuitry 45 can 'restore' the n linear splitting images into the HDR composite image that were originally transmitted by the image sensor 41 to the dynamic splitting circuitry 421. The method of HDR compositing for the n linear splitting images can use existing HDR compositing algorithms, and not described in detail here.

Specifically, post composite processing can be selected from but is not limited to: gamma correction, tonal compression, brightness and contrast adjustment, denoising, etc.

That is to say, in each round of iteration, on the basis of performing image splitting, exposure statistics and 3A statistics calculation on the HDR composite image of the current round composited by the image sensor through the circuitry 42, 43 and 44 to acquire multiple exposure values of the next round, and using the multiple exposure values of the next round to achieve more accurate multi-exposure control of the image sensor 41, furthermore, embodiments of the present disclosure further synchronously transmit the multiple exposure values of the next round to the HDR compositing circuitry 45 and further improve the quality of the final image (corresponding to the final image in FIG. 4) presented to users through circuitry 45 and 46, so that the final image presented on a terminal has a more optimized quality.

Figure 5:
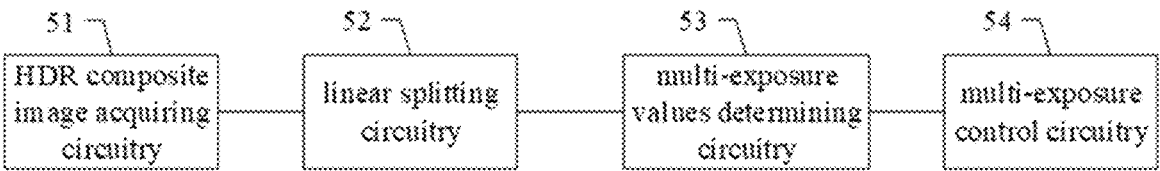
FIG. 5 is a schematic structural diagram of a multi-exposure control device for an image sensor according to an embodiment of the present disclosure.

Referring to FIG. 5, a schematic structural diagram of a multi-exposure control device for an image sensor according to an embodiment of the present disclosure is provided. The multi-exposure control device may include the following circuitries.

An HDR composite image acquiring circuitry 51 configured to acquire an HDR composite image of the current round composited by the image sensor, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round;

A linear splitting circuitry 52 configured to perform linear splitting processing on the HDR composite image of the current round based on the multiple exposure values of the current round to acquire multiple linear splitting images, wherein the number of the linear splitting images is equal to the number of the exposure values;

A multi-exposure values determining circuitry 53 configured to determine a corresponding exposure value based on exposure statistics of each linear splitting image, so as to acquire multiple exposure values of the next round;

A multi-exposure control circuitry 54 configured to perform multi-exposure control on the image sensor by using the multiple exposure values of the next round, so that the image sensor outputs multiple captured images with different exposures of the next round and performs HDR compositing to acquire an HDR composite image of the next round.

Figure 6:
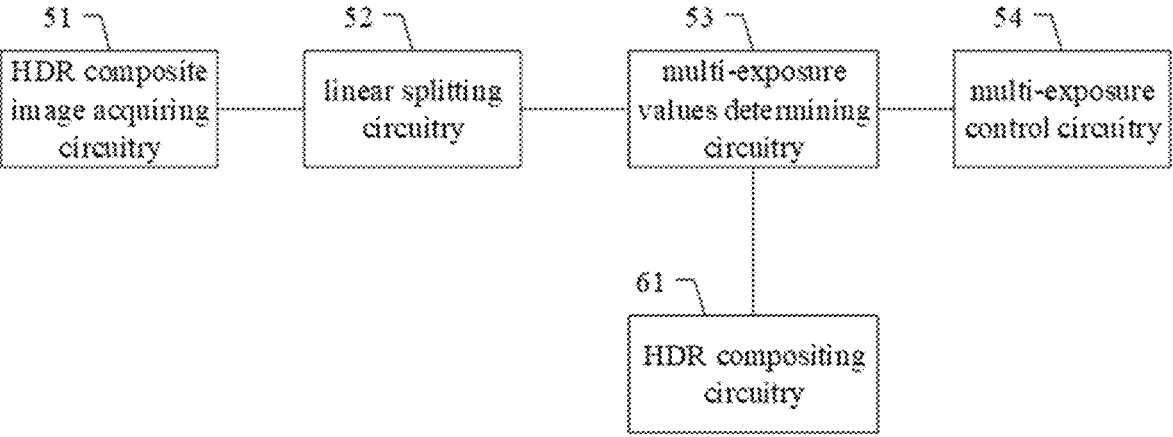
FIG. 6 is a schematic structural diagram of a multi-exposure control device for an image sensor according to an embodiment of the present disclosure.

Referring to FIG. 6, a schematic structural diagram of a multi-exposure control device for an image sensor according to an embodiment of the present disclosure is provided. The multi-exposure control device may include various circuitries as shown in FIG. 5, and may also include an HDR compositing circuitry 61. The HDR compositing circuitry 61 is configured to use the multiple exposure values of the next round determined by the multi-exposure values determining circuitry 53 to perform HDR compositing on the multiple linear splitting images, so as to acquire the final image of the next round.

The principle, specific implementation, and beneficial effects of multi-exposure control device for an image sensor may be referred to the relevant description of the multi-exposure control method for image sensors shown in the previous article and FIG. 2 and FIG. 3, and not described in detail here.

In an embodiment of the present disclosure, a storage medium, such as a computer-readable storage medium comprising computer-executable instructions stored thereon is provided, wherein when the computer-executable instructions executed by a processor, the steps of above multi-exposure control method for an image sensor shown in FIG. 2 and FIG. 3 is performed. The computer-readable storage medium may include non-volatile memory or non-transitory memory, and may also include optical disc, mechanical hard disk, solid-state hard disk and the like.

Specifically, in some embodiments of the present disclosure, the processor can be a central processing unit (CPU), and the processor can also be other general-purpose processors, digital signal processors (DSP), application specific integrated circuits (ASICs), field programmable gate arrays (FPGAs), or other programmable logic devices, discrete gate or transistor logic devices, discrete hardware components, etc. A general-purpose processor can be a microprocessor or any conventional processor.

It could be understood that the memory in the embodiments of the present disclosure may be volatile memory or non-volatile memory, or may include both volatile and non-volatile memory. Among them, the non-volatile memory can be read-only memory (ROM), programmable read-only memory (PROM), erasable programmable read-only memory (EPROM), electrically erasable programmable read-only memory (EPROM), or flash memory. The volatile memory can be random access memory (RAM), which is used as an external cache. By way of example but not limitation, many forms of random access memory (RAM) are available, such as static RAM (SRAM), dynamic random access memory (DRAM), synchronous DRAM (SDRAM), double data rate SDRAM (DDR SDRAM), enhanced SDRAM (ESDRAM), synchronous link DRAM (SLDRAM), and direct rambus RAM (DR RAM).

In an embodiment of the present disclosure, a terminal is provided, including: a processor; and a memory for storing processor-executable instructions; wherein the processor is configured to perform the steps of above multi-exposure control method for an image sensor shown in FIG. 2 and FIG. 3 when executing the processor-executable instructions. The terminal may include but is not limited to mobile phones, computers, tablet computers, etc., and may also be servers, cloud platforms, etc.

It could be understood that the term "and/or" in this article is only a description of the association relationship between related objects, indicating that there can be three types of relationships, for example, A and/or B, which can represent: the existence of A alone, the existence of A and B at the same time, and the existence of B alone. In addition, the character "/" in this article indicates that the associated objects before and after are in an "or" relationship.

The term 'multiple' used in the embodiments of the present disclosure refers to two or more.

The first and second descriptions mentioned in the embodiments of the present disclosure are only for illustration and differentiation of the described objects, without any order or special limitation on the number of devices in the embodiments of this application, and cannot constitute any limitation on the embodiments of the present disclosure.

It should be pointed out that the numbering of each step in the embodiments does not represent a limitation on the execution order of each step.

Although the present invention is disclosed as above, the present invention is not limited to this. Any skilled person in this field may make various changes and modifications without departing from the spirit and scope of the present invention, therefore the scope of protection of the present invention should be based on the scope defined by the claims.

The invention claimed is:

1. A multi-exposure control method for an image sensor, comprising:

acquiring an HDR composite image of the current round composited by the image sensor, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round;

performing linear splitting processing on the HDR composite image of the current round based on the multiple exposure values of the current round to acquire multiple linear splitting images, wherein the number of the linear splitting images is equal to the number of the exposure values;

determining a corresponding exposure value based on exposure statistics of each linear splitting image, so as to acquire multiple exposure values of a next round; and performing multi-exposure control on the image sensor by using the multiple exposure values of the next round, so that the image sensor outputs multiple captured images with different exposures of the next round and performs HDR compositing to acquire an HDR composite image of the next round.

2. The method according to claim 1, wherein said performing linear splitting processing on the HDR composite image of the current round based on the multiple exposure values of the current round to acquire multiple linear splitting images comprises:

determining an exposure ratio of each exposure value based on the multiple exposure values of the current round; and regarding each exposure ratio, performing linear splitting processing on the HDR composite image of the current round by using the exposure ratio to acquire the corresponding linear splitting image.

3. The method according to claim 2, wherein said regarding each exposure ratio, performing linear splitting processing on the HDR composite image of the current round by using the exposure ratio to acquire the corresponding linear splitting image comprises:

regarding at least a part of the pixels of the HDR composite image of the current round, calculating the product value of the pixel value of each pixel and the exposure ratio, and determining a linearly processed pixel value of the pixel based on the product value, so as to acquire the corresponding linear splitting image.

4. The method according to claim 3, wherein said determining a linearly processed pixel value of the pixel based on the product value comprises:

judging whether the product value is greater than or equal to a predetermined pixel value threshold;

responsive to a judgment result of yes, the pixel value threshold is adopted as the linearly processed pixel value of the pixel; and responsive to the judgment result of no, the product value is adopted as the linearly processed pixel value of the pixel.

5. The method according to claim 2, wherein the exposure ratio of each exposure value is determined by the following formula:

$$x_i = \frac{a_i}{a_{max}};$$

wherein $a_i$ represents an i-th exposure value of the current round, $a_{max}$ represents a maximum exposure value among the multiple exposure values of the current round, and $x_i$ represents the exposure ratio of the i-th exposure value among the multiple exposure values of the current round.

6. The method according to claim 1, wherein after acquiring the multiple exposure values of the next round, the method further comprises:

performing HDR compositing on the multiple linear splitting images by using the multiple exposure values of the next round, so as to acquire a final image of the next round.

7. A multi-exposure control device for an image sensor, comprising:

an HDR composite image acquiring circuitry configured to acquire an HDR composite image of the current round composited by the image sensor, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round;

a linear splitting circuitry configured to perform linear splitting processing on the HDR composite image of the current round based on the multiple exposure values of the current round to acquire multiple linear splitting images, wherein the number of the linear splitting images is equal to the number of the exposure values;

a multi-exposure values determining circuitry configured to determine a corresponding exposure value based on exposure statistics of each linear splitting image, so as to acquire multiple exposure values of a next round; and a multi-exposure control circuitry configured to perform multi-exposure control on the image sensor by using the multiple exposure values of the next round, so that the image sensor outputs multiple captured images with different exposures of the next round and performs HDR compositing to acquire an HDR composite image of the next round.

8. The device according to claim 7, the multi-exposure control device further comprises:

an HDR compositing circuitry configured to perform HDR compositing on the multiple linear splitting images by using the multiple exposure values of the next round, so as to acquire the final image of the next round, following acquiring the multiple exposure values of the next round.

9. A non-transitory computer-readable storage medium, comprising computer-executable instructions stored thereon which, when executed by a processor, cause the processor to perform a method, the method comprising:

acquiring an HDR composite image of the current round composited by the image sensor, wherein the HDR composite image is acquired by performing HDR compositing on multiple captured images with different exposures output by the image sensor in the current round, and the multiple captured images with different exposures are acquired by performing multi-exposure control on the image sensor using multiple exposure values of the current round;

performing linear splitting processing on the HDR composite image of the current round based on the multiple exposure values of the current round to acquire multiple linear splitting images, wherein the number of the linear splitting images is equal to the number of the exposure values;

determining a corresponding exposure value based on exposure statistics of each linear splitting image, so as to acquire multiple exposure values of a next round; and performing multi-exposure control on the image sensor by using the multiple exposure values of the next round, so that the image sensor outputs multiple captured images with different exposures of the next round and performs HDR compositing to acquire an HDR composite image of the next round.

10. The non-transitory computer-readable storage medium according to claim 9, wherein said performing linear splitting processing on the HDR composite image of the current round based on the multiple exposure values of the current round to acquire multiple linear splitting images comprises:

determining an exposure ratio of each exposure value based on the multiple exposure values of the current round; and regarding each exposure ratio, performing linear splitting processing on the HDR composite image of the current round by using the exposure ratio to acquire the corresponding linear splitting image.

11. The non-transitory computer-readable storage medium according to claim 10, wherein said regarding each exposure ratio, performing linear splitting processing on the HDR composite image of the current round by using the exposure ratio to acquire the corresponding linear splitting image comprises:

regarding at least a part of the pixels of the HDR composite image of the current round, calculating the product value of the pixel value of each pixel and the exposure ratio, and determining a linearly processed pixel value of the pixel based on the product value, so as to acquire the corresponding linear splitting image.

12. The non-transitory computer-readable storage medium according to claim 11, wherein said determining a linearly processed pixel value of the pixel based on the product value comprises:

judging whether the product value is greater than or equal to a predetermined pixel value threshold;

responsive to a judgment result of yes, the pixel value threshold is adopted as the linearly processed pixel value of the pixel; and responsive to the judgment result of no, the product value is adopted as the linearly processed pixel value of the pixel.

13. The non-transitory computer-readable storage medium according to claim 10, wherein the exposure ratio of each exposure value is determined by the following formula:

$$x_i = \frac{a_i}{a_{max}};$$

wherein $a_i$ represents an i-th exposure value of the current round, $a_{max}$ represents a maximum exposure value among the multiple exposure values of the current round, and $x_i$ represents the exposure ratio of the i-th exposure value among the multiple exposure values of the current round.

14. The non-transitory computer-readable storage medium according to claim 9, wherein after acquiring the multiple exposure values of the next round, the method further comprises:

performing HDR compositing on the multiple linear splitting images by using the multiple exposure values of the next round, so as to acquire a final image of the next round.

\*  \*  \*  \*  \*